United States Patent
Tian et al.

(10) Patent No.: US 7,006,282 B2
(45) Date of Patent: Feb. 28, 2006

(54) CONTROL SYSTEM AND METHOD FOR AN OPTICAL AMPLIFIER

(75) Inventors: Cechan Tian, Plano, TX (US); Susumu Kinoshita, Plano, TX (US); Joseph R. Rodriguez, Arlington, TX (US)

(73) Assignee: Fujitsu Limited, Kawasaki (JP)

( * ) Notice: Subject to any disclaimer, the term of this patent is extended or adjusted under 35 U.S.C. 154(b) by 291 days.

(21) Appl. No.: 10/725,817

(22) Filed: Dec. 1, 2003

(65) Prior Publication Data
US 2004/0114215 A1    Jun. 17, 2004

Related U.S. Application Data

(63) Continuation of application No. 10/107,727, filed on Mar. 26, 2002, now Pat. No. 6,690,508.

(51) Int. Cl.
*H01S 3/00* (2006.01)

(52) U.S. Cl. .............................. 359/341.41; 359/341.4

(58) Field of Classification Search ............ 359/341.4, 359/341, 41, 341.43
See application file for complete search history.

(56) References Cited

U.S. PATENT DOCUMENTS

| | | | |
|---|---|---|---|
| 4,954,786 A | 9/1990 | Yamakawa et al. ............ 330/4.3 |
| 5,088,095 A | 2/1992 | Zirngibl ............................ 372/6 |
| 5,513,029 A | 4/1996 | Roberts ......................... 359/177 |
| 5,680,246 A | 10/1997 | Takahashi et al. ............ 359/341 |
| 5,822,112 A | 10/1998 | Itou et al. ..................... 359/341 |
| 5,870,217 A | 2/1999 | Itou et al. ..................... 359/179 |
| 5,969,840 A | 10/1999 | Roberts ......................... 359/161 |
| 6,038,063 A * | 3/2000 | Tsuda et al. ............. 359/341.41 |
| 6,052,221 A | 4/2000 | Terahara ....................... 359/341 |
| 6,055,092 A | 4/2000 | Sugaya et al. ............... 359/337 |
| 6,084,704 A | 7/2000 | Button et al. ................ 359/337 |
| 6,104,526 A | 8/2000 | Kakui .......................... 359/337 |
| 6,141,127 A | 10/2000 | Boivin et al. ................ 359/124 |
| 6,160,648 A | 12/2000 | Oberg et al. ................. 359/110 |
| 6,160,659 A | 12/2000 | Kinoshita .................... 359/337 |
| 6,163,395 A | 12/2000 | Nemecek et al. ........... 359/187 |
| 6,166,850 A | 12/2000 | Roberts et al. .............. 359/341 |
| 6,215,583 B1 | 4/2001 | Lagerström et al. ........ 359/341 |
| 6,233,092 B1 | 5/2001 | Flood et al. ................. 359/345 |
| 6,246,514 B1 * | 6/2001 | Bonnedal et al. ....... 359/341.41 |

(Continued)

FOREIGN PATENT DOCUMENTS

EP    1 182 808 A2    2/2002

(Continued)

OTHER PUBLICATIONS

J. Drake et al., "A comparison of practical gain and transient control techniques for erbium doped fiber amplifiers," Nortel PLC Optoelectronics, pp. 163-165.

(Continued)

*Primary Examiner*—Mark Hellner
(74) *Attorney, Agent, or Firm*—Baker Botts L.L.P.

(57) ABSTRACT

A method and system for controlling the gain of the amplification of an optical signal is provided that includes both electrical feedforward and feedback. In a feedforward portion of an optical amplifier, the method includes receiving an optical signal and measuring an input power. Based on the measured input power and a desired gain, a feedforward pump power is determined. The pump power is adjusted based on the determined pump power. In a feedback portion of an optical amplifier, an output power is measured and gain is determined based on the output power and the measured input power. The measured gain is compared to a desired gain and the pump power is adjusted based on that comparison.

15 Claims, 3 Drawing Sheets

U.S. PATENT DOCUMENTS

| | | |
|---|---|---|
| 6,339,495 B1 | 1/2002 | Cowle et al. ............ 359/341.4 |
| 6,341,034 B1 | 1/2002 | Sun et al. .............. 359/341.41 |
| 6,690,508 B1 * | 2/2004 | Tian et al. ............... 359/341.4 |

FOREIGN PATENT DOCUMENTS

| | | |
|---|---|---|
| WO | WO 01/54237 A1 | 7/2001 |

OTHER PUBLICATIONS

D.H. Richards et al., "Optical Network Simulation and the MONET DC Network," Telcordia Technologies, pp. 206-208.

J.F. Massicott, et al., "1480nm pumped erbium doped fibre amplifier with all optical automatic gain control," *Electronics Letters*, vol. 30, No. 12, Jun. 9, 1994, pp. 962-964.

M. Fukutoku et al., "Pump power reduction of optical feedback controlled EDFA using electrical feedforward control," Optical Amplifiers and Their Applications, *Technical Digest*, 1998, pp. 32-35.

Grenfeldt, "ERION-Ericsson optical networking using WDM technology," Ericsson Review No. 3, pp. 132-137.

Ashmead, "ROADMap for the Metro Market," Fiberoptic Product News, 3 pages (36, 38, and 40), Oct. 2001.

G. Luo et al., "Experimental and Theoretical Analysis of Relaxation-Oscillations and Spectral Hole Burning Effects in All-Optical Gain-Clamped EDFA's for WDM Networks," *Journal of Lightwave Technology*, vol. 16 No. 4, Apr. 1998, pp. 527-533, Apr. 1998.

H. Ono et al., "Automatic Gain Control in Silica-Based EDFA with over 50 nm Flat Gain Bandwidth using an All Optical Feedback Loop," NTT Network Innovation Laboratories, Optical Amplifiers and Their Applications Conference, *Technical Digest*, 1999, pp. 106-109, 1999.

K. Motoshima et al., "A Channel-Number Insensitive Erbium-Doped Fiber Amplifier With Automatic Gain and Power Regulation Function," *Journal of Lightwave Technology*, vol. 19 No. 11, Nov. 2001, pp. 1759-1767. Nov. 2001.

Batchellor, "Optical Networking the Ericsson Way, " Ericsson Limited, Business Unit Transport and Cable Networks, pp. 1-4, Feb. 22, 2002.

C.Y. Liaw et al., "Development of an Automatic Gain Controller Card for Next Generation EDFAs", *ACTA OPTICA SINICA*, vol. 23, Supplement 413, Paper No. 0253-2239(2003) 16C3-6, Oct. 2003, pp. 1-2, Oct. 2003.

* cited by examiner

CONTROL SYSTEM AND METHOD FOR AN OPTICAL AMPLIFIER

CROSS-REFERENCE TO RELATED APPLICATION

This application is a continuation of U.S. application Ser. No. 10/107,727 filed Mar. 26, 2002, now U.S. Pat. No. 6,690,508, and entitled "Control System and Method For An Optical Amplifier".

TECHNICAL FIELD

The present invention relates generally to optical communication networks and, more particularly, to a control system and method for an optical amplifier.

BACKGROUND

Telecommunications systems, cable television systems, and data communications networks use optical networks to rapidly convey large amounts of information between remote points. In an optical network, information is conveyed in the form of optical signals through optical fibers. Optical fibers comprise thin strands of glass capable of transmitting the signals over long distances with small loss.

Optical networks often employ wavelength division multiplexing (WDM) or dense wavelength division multiplexing (DWDM) to increase transmission capacity. In WDM and DWDM networks, a number of optical channels are carried in each fiber at disparate wavelengths. Network capacity is based on the number of wavelengths, or channels, in each fiber and the data rates of the channels.

To increase the signal strength over long distances, optical communications systems typically include optical amplifiers at or between network nodes. The amplifiers typically include automatic gain control (AGC) to maintain a desired amplification factor (gain) across the amplifier. An optical amplifier may be used for each wavelength or channel transported by a fiber; however, using one amplifier for all wavelengths reduces system costs.

SUMMARY

The present invention provides a control system and method for an optical amplifier. In a particular embodiment, pure-electric feedforward and feedback controls are provided for an optical amplifier to provide sub-microsecond response time to fiber cuts and other fast channel changing events.

In accordance with one embodiment of the present invention, a system and method for controlling an optical amplifier includes controlling the optical amplifier pump lasers with electrical feedforward and feedback circuits. In the feedforward portion, based on the measured total input power, a feedforward pump power is determined. The pump power is adjusted based on the determined pump power. In the feedback portion, an output power is measured and gain is determined based on the output power and the measured input power. The measured gain is compared to a desired gain and the pump power is adjusted based on that comparison.

Technical advantages of the invention include providing an improved control system and method for an optical amplifier. In one embodiment, an optical amplifier includes automatic gain control (AGC) with nominal feedforward and compensation feedback control that greatly improves response time down to sub-microsecond speeds for fast channel adding or dropping processes, such as, for example, a fiber cut. In particular, the nominal feedforward control monitors the total input power of signals into the amplifier, and provides a nominal pump current to the pump laser of the amplifier based only on the total input power. Because the pump power is changed immediately after the change in a number of channels of the input signal, no extra energy is stored in the gain medium of the amplifier and no excess population inversion is generated during the transition process; therefore, no gain excursion will be generated. As a result, better protection is provided to downline network components by reducing the probability of a large power spike or power drop. In addition, transmission errors caused by power fluctuations are limited or minimized.

Another technical advantage of the present invention includes providing a pure-electric controlled AGC for an optical amplifier. In one embodiment, the electric controlled AGC includes the nominal feedforward control and a compensation feedback control. The pure-electric AGC provides fast response times without the need for new optical components or extra pump power. As a result, costs of the amplifier and/or amplifier control are limited or minimized.

Still another technical advantage of the present invention includes providing nominal feedforward control for an optical amplifier with aging factor compensation. In particular, pump laser aging will increase the required pump current for an input power, which will affect a predefined nominal value of pump current used for feedforward control. Because the pump power is always monitored in the optical amplifier, the aging factor can be determined automatically by the built-in control unit and an aging factor applied.

Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION

Figure 1:
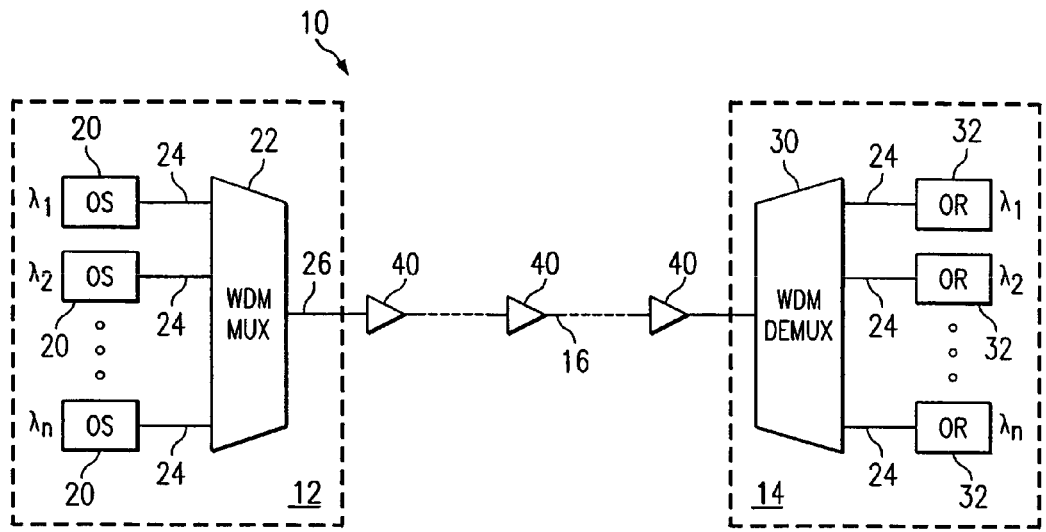
FIG. 1 is a block diagram illustrating an exemplary optical communication system.

FIG. 1 illustrates an optical communication system 10 in accordance with one embodiment of the present invention. In this embodiment, the optical communication system 10 is a wavelength division multiplexed (WDM) system in which a number of optical channels are carried over a common path at disparate wavelengths. It will be understood that the optical communication system 10 may comprise other suitable single channel, multichannel, or bi-directional transmission systems. Optical communication system 10 may be a long-haul, metro ring, metro core, or other suitable network or combination of networks.

Referring to FIG. 1, the WDM system 10 includes a WDM node 12 at a source end point and a WDM node 14 at a destination end point coupled together by an optical link 16. The WDM node 12 transmits data in a plurality of optical signals, or channels, over the optical link 16 to the remotely located WDM node 14. Spacing between the channels is selected to avoid or minimize cross talk between adjacent channels.

The WDM node 12 includes a plurality of optical transmitters 20 and a WDM multiplexer 22. Each optical transmitter 20 generates an optical information signal 24 on one of a set of distinct wavelengths $\lambda_1, \lambda_2 \ldots \lambda_n$. The optical information signals 24 comprise optical signals with at least one characteristic modulated to encode audio, video, textual, real-time, non-real-time, or other suitable data. The optical information signals 24 are multiplexed into a single WDM signal 26 by the WDM multiplexer 22 for transmission on the optical link 16. It will be understood that the optical information signals 24 may be otherwise suitably combined into the WDM signal 26. The WDM signal is transmitted in the synchronous optical network (SONET) or other suitable format.

The WDM node 14 receives, separates, and decodes the optical information signals 24 to recover the included data. In one embodiment, the WDM node 14 includes a WDM demultiplexer 30 and a plurality of optical receivers 32. The WDM demultiplexer 30 demultiplexes the optical information signals 24 from the single WDM signal 26 and sends each optical information signal 24 to a corresponding optical receiver 32. Each optical receiver 32 optically or electrically recovers the encoded data from the corresponding signal 24. As used herein, the term each means every one of at least a subset of the identified items.

The optical link 16 comprises optical fiber or other suitable medium in which optical signals may be transmitted with low loss. Interposed along the optical link 16 are one or more optical amplifiers 40. The optical amplifiers 40 increase the strength, or boost, one or more of the optical information signals 24, and thus the WDM signal 26, without the need for optical-to-electrical conversion. Signal regenerators may be provided as needed along the optical link 16.

In one embodiment, the optical amplifiers 40 comprise rare earth doped fiber amplifiers, such as erbium doped fiber amplifiers (EDFAs), erbium doped waveguide amplifiers (EDWAs), and other suitable amplifiers operable to amplify the WDM signal 26 at a point in the optical link 16. In other embodiments, for example, the optical amplifiers 40 may comprise a neodymium doped fiber, a thulium doped fiber, a doped waveguide, or other suitable gain medium.

Figure 2:
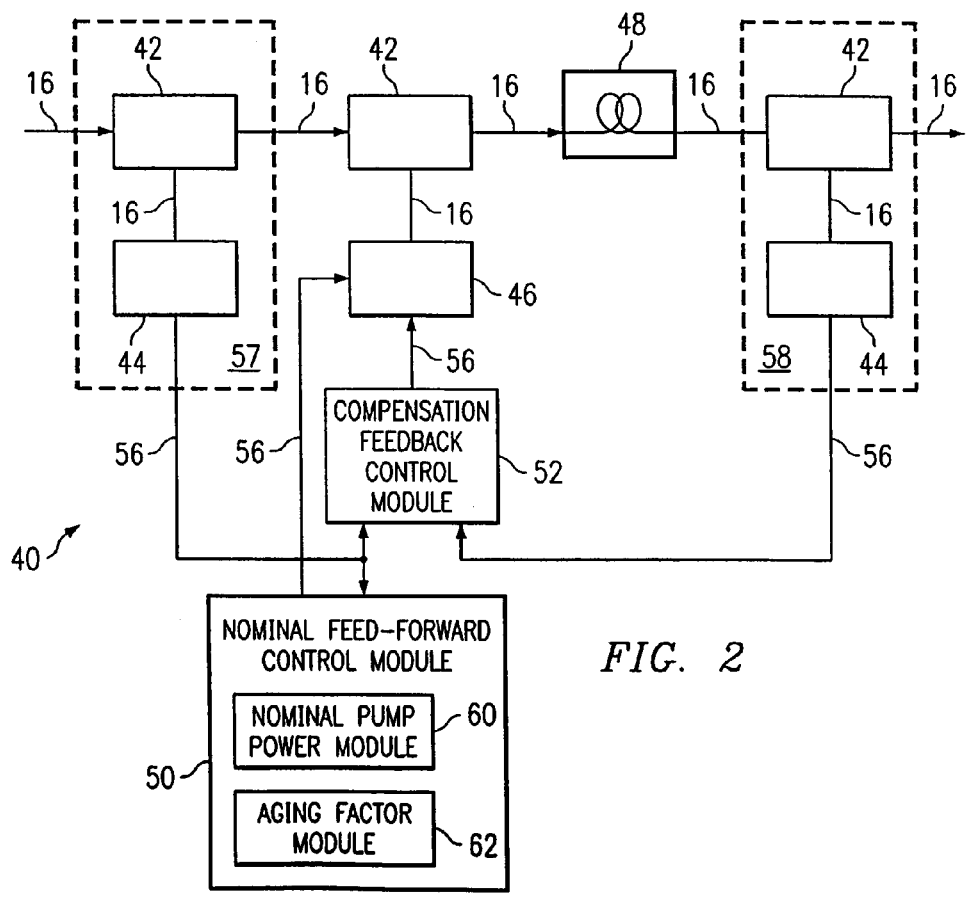
FIG. 2 is a block diagram illustrating details of the optical amplifier of FIG. 1 in accordance with one embodiment of the present invention.

FIG. 2 illustrates details of the optical amplifier 40 in accordance with one embodiment of the present invention. In this embodiment, optical amplifier 40 includes a plurality of optical couplers 42, a plurality of photodetectors 44, an optical pump 46, and a gain medium 48. Optical amplifier 40 also includes a nominal feedforward control module 50, a compensation feedback control module 52, and a plurality of electrical links 56 connecting the components.

The optical coupler 42 and photodetector 44 on an ingress side of the gain medium 48 forms an input monitor 57 while the optical coupler 42 and photodetector 44 on an egress side of gain medium 48 forms an output monitor 58. Input monitor 57 is operable to tap the ingress optical fiber 16 to obtain an ingress optical signal, to measure a power of the ingress optical signal, and to generate an input power signal based on the power of the ingress optical signal. As described in more detail below, the input power signal is provided to the nominal feedforward control module 50 and the compensation feedback control module 52. The output monitor 58 taps an egress optical fiber to obtain an egress optical signal, measures the power of the egress optical signal, and generates an output power signal based on the power of the egress optical signal. As described in more detail below, the output power signal is provided to the compensation feedback control module 52. Together, the nominal feedforward control 50 and the compensation feedback control 52 provide a pure-electric automatic gain controlled optical amplifier.

In the input and output monitors 57 and 58, optical couplers 42 are each operable to split an incoming signal into discrete signals or otherwise passively generate discrete signals based on a single signal. The discrete signals may be identical in form and/or content or may suitably differ. In one embodiment, each optical coupler 42 is a coupler operable to tap the connected link 16 and provide an optical signal of between 1–5% of the tapped signal from the link 16 to the corresponding photodetector 44.

Photodetectors 44 are each operable to receive and measure the provided optical signal and to generate a power signal based on the optical signal. The power signal indicates or is indicative of the power of the optical signal on the corresponding link 16.

Optical pump 46 is operable to receive pump control signals from the nominal feedforward control 50 and compensation feedback control 52 and generate a pump energy signal based on the pump control signals. In optical pump 46, the control signals may be combined to form a single control signal for the optical pump 46. It will be understood that the control signals from the nominal feedforward control 50 and compensation feedback control 52 may be combined in one of the control modules or otherwise combined to provide a single control signal to optical pump 46, or may otherwise act upon optical pump 46 to control the pump energy signal. Optical pump 46 may be a continuous wave laser or other suitable energy source operable to provide electromagnetic energy capable of amplifying an optical signal.

Gain medium 48 is operable to receive an optical signal and pump energy signal and amplify the optical signal with the pump energy signal. Gain medium 48 may comprise, for example, erbium (Er) doped fiber, neodymium (Nd) doped fiber, thulium (Tm) doped fiber, an erbium doped waveguide, or other medium operable to suitably transfer pump energy to an optical transport signal comprising one or more traffic channels. In the erbium doped fiber embodiment, the gain medium may, in a particular embodiment, have a length of between 5 and 100 meters or other suitable lengths.

Nominal feedforward control module 50 is operable to receive the input power signal from the input monitor 57 and to generate a nominal or feedforward pump control signal based on the received input power signal. The nominal pump control signal is provided by the feedforward module 50 to optical pump 46.

In a particular embodiment, feedforward module 50 comprises nominal pump power module 60 and aging factor module 62. In this embodiment, nominal pump power module 60 is operable to receive the input power signal from input photodetector 44 and determine a base nominal pump power based on the input power signal. Aging factor module 62 is operable to adjust the base nominal pump power determined by nominal pump power module 60 based on an age or deterioration level of a laser associated with optical pump 46. The feedforward module generates and transmits the nominal pump control signal to optical pump 46 based on the nominal pump power determined by nominal pump power module 60 and aging factor module 62.

Compensation feedback control module 52 is operable to receive output power and input power signals from monitors 57 and 58 and generate feedback pump control signal based on the received output power and input power signals. In one embodiment, feedback module 52 compares the output and input power signals to determine a gain for the amplifier 40 and generates a feedback pump control signal to increase, decrease, or maintain the current pump energy level to provide a specified gain for the optical transport signal.

Feedforward module 50 and feedback module 52, as well as other suitable components of optical amplifier 40, may comprise analog circuitry, digital circuitry embedded on a chip, or otherwise suitably constructed. Feedback module 52 and feedforward module 50 may also comprise logic embedded in media. The logic comprises functional instructions for carrying out programmed tasks. The media comprises computer disks or other suitable computer-readable media, application specific integrated circuits (ASIC), field programmable gate arrays (FPGA), digital signal processors (DSP), or other suitable specific or general purpose processors, transmission media, or other suitable media in which logic may be encoded and utilized.

In operation, an optical signal to be amplified is received at an input or ingress side of optical amplifier 40 along optical link 16 and is split into two signals at the optical coupler 42 of the input monitor 57. One part of the split signal passes through first optical coupler 42 and travels along optical link 16 to a second optical coupler 42 where a pump energy signal received from pump 46 is added to link 16. The combined signal travels along optical link 16 through gain medium 48 where the signal is amplified. The amplified signal proceeds along optical link 16 to the optical coupler 42 of the output monitor 58 where it is again split into two components. A first component travels along egress optical link 16 out of optical amplifier 40 and continues through the network to the intended destination.

Returning to input monitor 57, the input photodetector 44 receives the second part of the split signal provided by the input optical coupler 42, measures an input power of the signal, and generates an input power signal based on that power. The input power signal is transmitted along electrical link 56 to feedback module 52 and feedforward module 50. Similarly, in output monitor 58, the split signal travels along an optical link 16 to output photodetector 44 wherein an output power of the signal is measured and an output power signal is generated based on that power. The output power signal is transmitted along electrical link 56 to feedback module 52.

Feedforward module 50 receives the input power signal and, via nominal pump power module 60, determines nominal pump power, which is an approximation of the pump power to achieve the specified or desired gain in the amplifier 40 based on the input power as communicated by input monitor 57. The determination may be based on a strictly linear relationship between input power and pump power, a monotonic relationship between input power and pump power, or other suitable relationship, or may include an aging factor from aging factor module 62 to compensate for pump degradation, or any other suitable algorithm based on the network and amplifier configuration. A nominal pump control signal is generated by feedforward module 50 instructing pump 46 to generate a pump energy signal based on the determined pump power required. The pump control signal may comprise an electrical current at which the pump 46 is to operate to generate the determined pump power. It will be understood that the pump control signal may otherwise suitably indicate to the pump the nominal pump power determined by the feedforward module 50. The nominal pump control signal, as well as other power and/or control signals, may be any analog, digital, electrical, or other suitable types of signals.

Feedback module 52 receives the input power and output power signals generated by the input and output monitors 57 and 58. Feedback module 52 determines an actual gain of the amplifier by, for example, comparing the power signals from the monitors 57 and 58, resulting in an actual gain. Generally, gain is the ratio of output power to input power. The actual gain is compared to a desired gain and a feedback pump control signal is generated based on the comparison. For example, if the actual gain is lower than the desired gain a feedback pump control signal is generated and transmitted to pump 46 increasing the pump power of pump 46 to increase the gain. Likewise, if the actual gain is higher than the desired gain, a feedback pump control signal is generated and transmitted to pump 46 directing pump 46 to decrease the pump power. Thus, the feedback pump control signal may indicate a positive or negative adjustment to pump power rather than a specified pump power. The specified change in pump power may be in terms of a change in electrical current at which the pump 46 operates.

Working together, feedback module 52 and feedforward module 50 operate simultaneously, contemporaneously, and continually, perpetually, and/or intermittently to control pump 46 to provide a specified amplification (gain) of the amplifier 40 based on the changing input power and output power of the optical transport signal. In particular, feedforward module 50 instructs the pump 46 to generate a pump energy signal at approximately the appropriate level to achieve the desired gain. The feedforward pump energy signal is adjusted in a time constant of one microsecond +/−5%, or between 0.8 to 1.2 microseconds or otherwise on the order of a microsecond so as to provide fast transient response. As used herein, "on the order of" means within a range centered around the target number. Feedback module 52 makes slower adjustments (on the order of 100 microseconds) and instructs pump 46 to provide a pump energy signal at the exact power level required to achieve the desired gain. In this way, factors such as channel allocation, wavelength-dependent response of the photodetectors, and other factors are accounted for. Thus, feedforward module 50 is operable to quickly adjust the pump power of pump 56 to a range that is relatively near that of the desired pump power, while feedback module 50 provides fine tuning to adjust the pump power to the exact level required. The combination of the feedforward and feedback controls suppress the transient gain excursion in the optical amplifier.

Figure 3A:
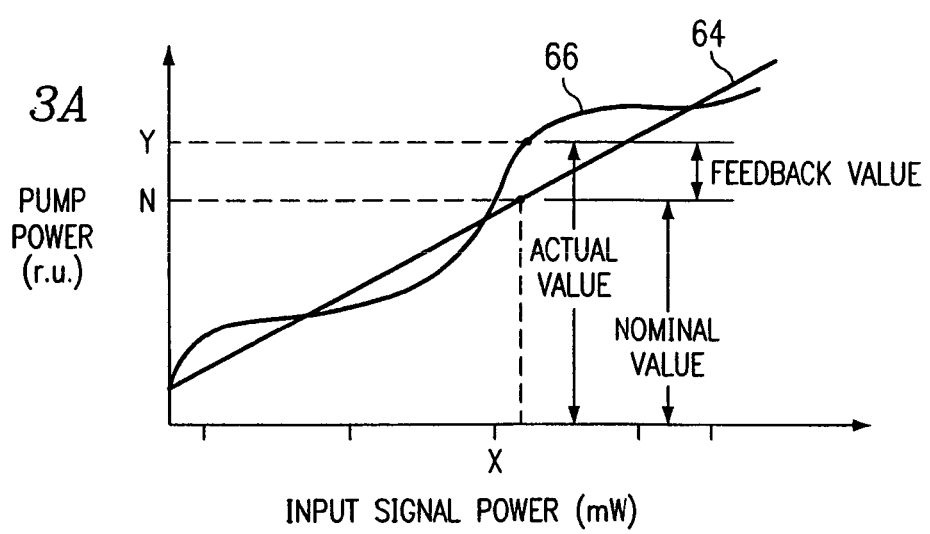
FIGS. 3A–B is a graph illustrating nominal feedforward and compensation feedback control for the optical amplifier of FIG. 2 in accordance with one embodiment of the present invention.
Figure 3B:
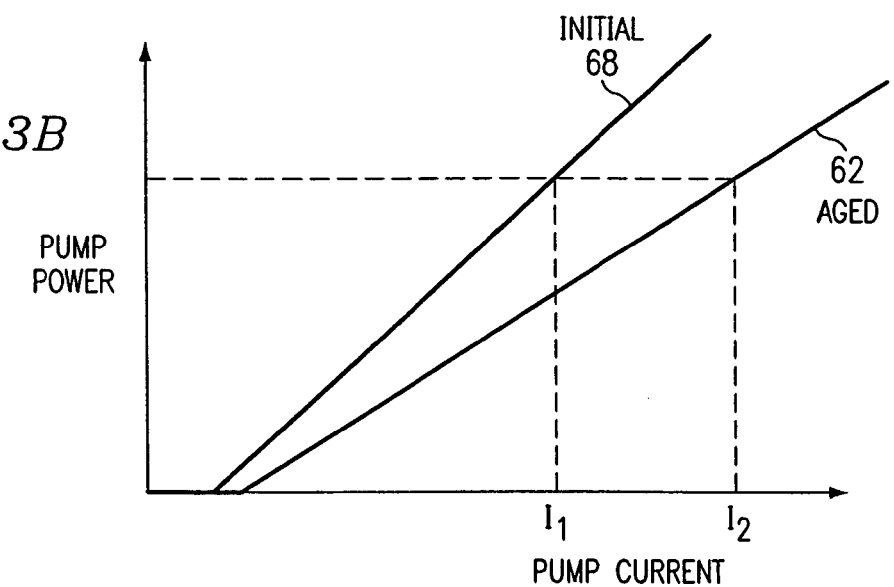

FIGS. 3A–B illustrate nominal feedforward and compensation feedback control for optical amplifier 40 in accordance with one embodiment of the present invention. In this embodiment, the nominal feedforward value is determined based on an approximate linear relationship between input optical power and pump power to achieve a specified gain while compensation feedback fine tunes pump power to count for actual channel allocation. In addition, the nominal pump power is adjusted to compensate for laser aging.

For an amplifier with a particular gain, the pump power required to maintain a constant population inversion, and thereby minimize gain tilt, is a function of the input power and the channel allocations. In this function, a change in total input power dominates the change in the required pump power, although a change in channel allocations also contributes to the change in the required pump power. In one embodiment, the nominal pump power is the average of the required for all of the possible channel allocations at the same input power. The feedback compensation factor is the difference between the pump power required by a specific channel allocation and the nominal pump power, and is much smaller than the nominal pump power.

Referring to FIG. 3, a linear relationship 64 is utilized by nominal pump power module 60 to determine a pump power based on the input power of an optical signal. This linear relationship 64 may be described mathematically as, for example, P=f(I). The feedback module 52 adjusts the pump power from the nominal value determined by the linear relationship 64 to an actual value determined by the actual relationship 66 which accounts for operating channel allocation. Thus, the feedback value represents the difference, positive or negative, between the nominal value determined by linear relationship 64 and the actual value determined by actual relationship 66. The input power may be in milliwatts (mW) and pump power in milliwatts (mW). In an alternative embodiment, the nominal pump power may be determined based on a non-linear relationship, a monotonic relationship, or other suitable algorithm that determines an approximate pump power to provide a specified gain based on input power of an optical transport signal. In one embodiment, the algorithm may also compensate for pump degradation or aging.

In operation, in response to at least a change in input power, for example, caused by a change in a number of channels, the feedforward module 50 adjusts the pump power based on the new value of the input power within one to three microseconds or less. For example, the adjustment may take less than one microsecond. During this time and/or thereafter, feedback module 52 fine tunes the adjustment to the pump power required to achieve a desired gain. This fine tuning adjustment is relatively slow compared to the adjustment of feedforward module 52. For example, the feedback function may require 100–300 microseconds to complete.

Referring to FIG. 3B, aging factor module 62 of feedforward module 50 may utilize one or more linear relationships 68 between an output pump power and an input pump current to account for pump laser aging. For example, a pump current of I1 may be used by the pump 46 to generate a pump power of P when the pump is first deployed in the system 10. For a temperature stabilized pump laser, for example, the output power has a monotonic dependence on the pump current.

After operation for a period of time, in which pump 46 succumbs to aging, a pump current of I2 is needed by pump 46 to generate the same power P. In this embodiment, the nominal pump value determined by the nominal pump power module 60 using linear relationship 64 may be input into the aging factor module 62 which may then generate the needed pump current based on the age of the pump 46. It will be understood that aging compensation may be otherwise determined and applied to the nominal pump power. For example, the age compensation may be calculated based on any suitable algorithm. For example, because amplifier 40 is always monitoring the output power, the aging factor can be automatically determined by the control circuit.

Figure 4:
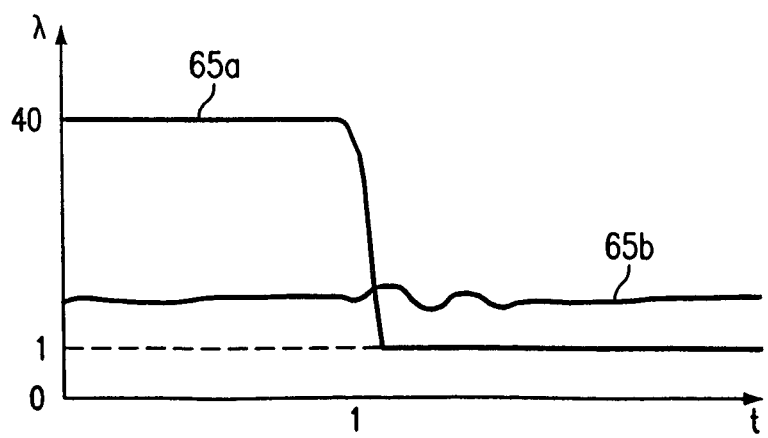
FIG. 4 is a graph illustrating the performance characteristics of the optical amplifier of FIG. 2 in accordance with one embodiment of the present invention.

FIG. 4 illustrates the power fluctuation associated with a channel drop event in system 10 in accordance with one embodiment of the present invention. In the illustrated example, the network 10 experiences a fast removal of channels, from forty channels to one channel in 100 ns as might occur during a fiber-cut. As shown by input power 65a, the rapid removal of channels effects a rapid decrease in input power. As shown by output power of the survival channels 65b, the rapid decrease in pump power by the feedforward module 50 in response to the fiber cut reduces the power surge to less than 1 dB, well within the tolerances of most network components. In connection with other controls, feedback module 52 provides fine tuning of the gain of the amplifier in a few milliseconds.

Figure 5:
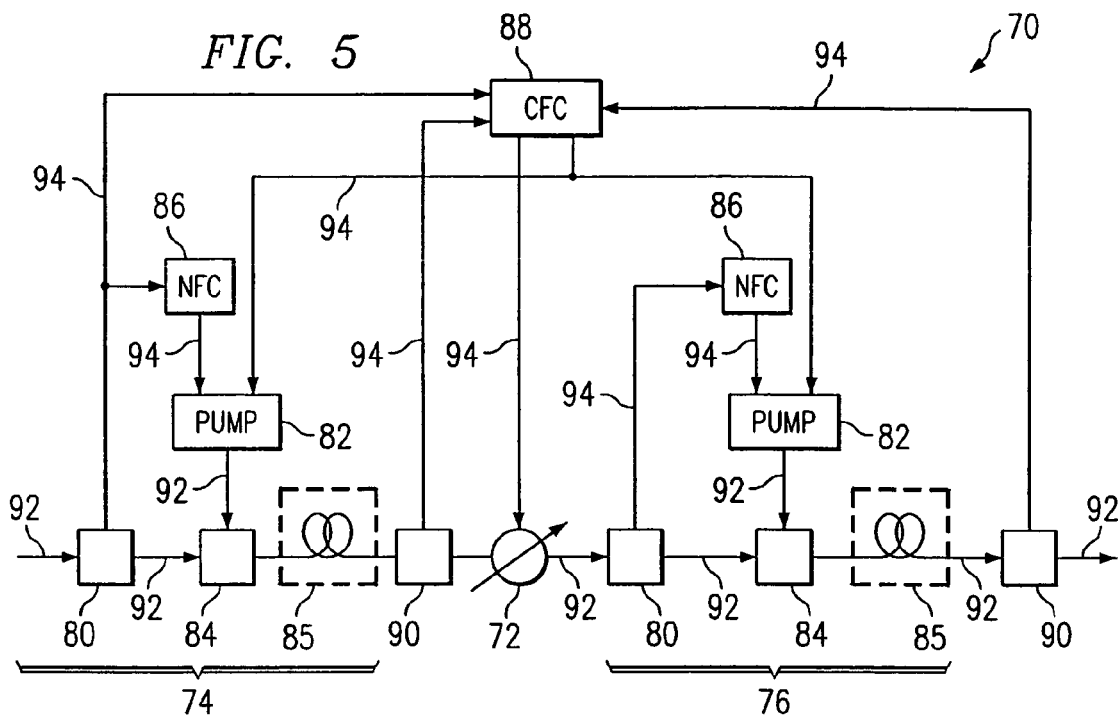
FIG. 5 is a block diagram illustrating a multistage optical amplifier in accordance with one embodiment of the present invention.

FIG. 5 illustrates an optical amplifier 70 in accordance with another embodiment of the present invention. In this embodiment, optical amplifier 70 is a multistage amplifier, consisting of two or more gain media and pumps. In addition, optical amplifier 70 also includes a variable optical attenuator 72 positioned between the first stage 74 and the second stage 76 of the optical amplifier 70. Variable optical attenuator 72 is operable to receive an optical signal and an attenuator control signal and attenuate the optical signal based on the attenuator control signal. The variable optical attenuator 72 is adjustable to attenuate at different levels to achieve a variable gain across the optical amplifier 70.

Referring to FIG. 5, the first and second stages 74 and 76 each include an input monitor 80, an optical pump 82 and a gain medium 85. The first and second stages 74 and 76 also each include a nominal feedforward control module 86 coupled between the input monitor 80 and pump 82. The first and second stages 74 and 76 share a compensation feedback control module 88 coupled between the input monitor 80 of the first stage 74 and an output monitor 90 of each stage 74 and 76. The feedback module 88 provides feedback to the pump 82 of each stage 74 and 76. The monitors, pumps, gain mediums, and controllers may each be implemented as previously described in connection with amplifier 40 of FIG. 2. Optical fiber links 92 and electrical links 94 may also be implemented as described in connection with optical amplifier 40. In an exemplary multi-stage embodiment, the total gain across the amplifier 70 remains constant, while the gain across each stage 74 and 76 may vary.

In operation, a transport optical signal at an input side of optical amplifier 70 is tapped by input monitor 80 which generates an input power signal based on the power of the optical signal. The input power signal is provided to a feedback module 88 and a feedforward module 86. A first gain medium 85 is associated with a first feedforward module 86. The first feedforward module 86 adjusts the pump power associated with the first pump 82 and gain medium 85. The relation between the feedforward signal and the input power may be limited by the maximum available power of the associated pump 82 in this stage 74. In this case, the feedforward signal saturates if input power is higher than a certain value, and the gain of the first stage decreases.

The first-stage amplified signal passes through an output monitor 90 that generates a first-stage output signal and transmits the first-stage output signal to compensation feedback control module 88 along link 94. Compensation feedback control module 88 generates an attenuator control signal and transmits the attenuator control signal to variable optical attenuator 72 along link 94. Variable optical attenuator 72 receives the attenuator control signal and attenuates the first-stage amplified signal based on the attenuator control signal. The attenuated signal proceeds to the input monitor 80 of the second stage 76, which generates a second input power signal based on the power of the signal from variable optical attenuator 72 and the desired second-stage gain. This desired gain may change because of the change in the first-stage gain. The second input power signal is forwarded to a second feedforward module 86, which, in turn, generates a control signal for a pump 82 associated with a second gain medium 85.

The second-stage amplified signal passes from second gain medium 85 through the output monitor 90, which generates an output power signal for transmission to feedback module 88. Feedback module 88 compares the input power signal received from the first input monitor 80 with the output power signal and the attenuation value of the variable attenuator 72 to generate a feedback pump control signal that controls the pumps 82 associated with each of the first and second stages 74 and 76 of the amplifier 70.

Figure 6:
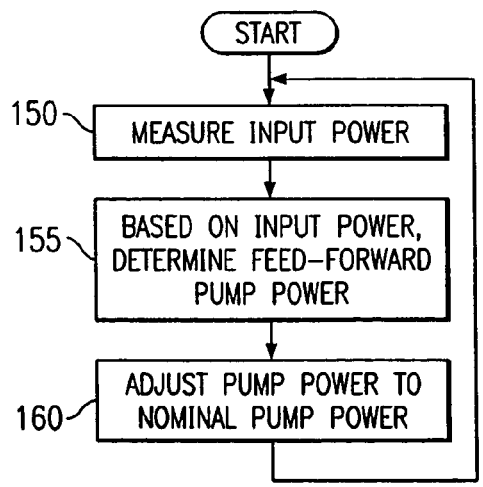
FIG. 6 is a flow diagram illustrating a method for controlling amplification of an optical signal in a gain medium in accordance with one embodiment of the present invention.

FIG. 6 illustrates a method for feedforward control of amplification of an optical signal in accordance with one embodiment of the present invention. In this embodiment, the signal is amplified with single stage optical amplification, but it will be understood that a similar process may be employed for a multi-stage optical amplifier.

Referring to FIG. 6, the process begins at step 150 wherein a signal is received by the optical amplifier and an input power of the signal is measured. In one embodiment, the optical transport signal is tapped by optical coupler 42 and the input power is measured by photodetector 44 of input monitor 57. Next, at step 155, a feedforward pump power is determined based on the input power. As described above, the feedforward pump power may be a simple linear comparison of input power to pump power, a monotonic comparison, or may be by a more complicated algorithm, as required by the particular system in which the optical amplifier is a component. In one embodiment, this step is performed by nominal pump power module 60 and aging factor module 62 of feedforward module 50.

Next, at step 160, the pump power of the pump laser is adjusted based on the nominal pump power determined in step 155. The process is continuous or otherwise suitable repeats during operation of the amplifier, and therefore, returns to step 150, wherein an input power is measured.

Figure 7:
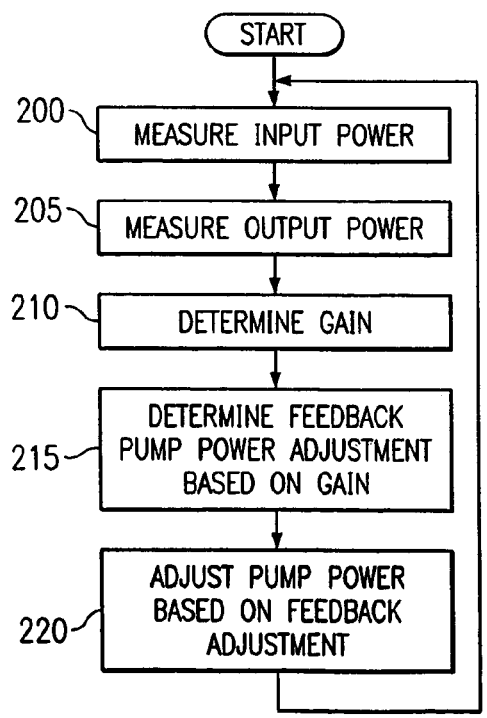
FIG. 7 is a flow diagram illustrating a method for controlling amplification of an optical signal in a gain medium in accordance with one embodiment of the present invention.

FIG. 7 illustrates a method for feedback control of amplification of an optical signal in accordance with one embodiment of the present invention. In this embodiment, the signal is amplified with single stage optical amplification, but it will be understood that a similar process may be employed for a multi-stage optical amplifier.

Referring to FIG. 7, the process begins at step 200 wherein a signal is received by the optical amplifier and an input power of the signal is measured. In one embodiment, this step is performed by input monitor 57. Next, at step 205, the output power of the optical amplifier is measured. In one embodiment, this step is performed by output monitor 58.

At step 210, the gain of the optical amplifier is determined based on the measured output power and the measured input power of steps 205 and 200 respectively. In one embodiment, this step is performed by feedback module 52. At step 215, a feedback pump power adjustment is determined based on the gain. The gain may be a constant desired gain or may be an adjustable gain, as required by the particular network in which the optical amplifier is a component. In one embodiment, this step is performed by a feedback module 52.

At step 220, the pump power of the pump laser is adjusted based on the feedback pump power adjustment. For example, if the measured gain is lower than the desired gain, the pump power is adjusted upwards for increased amplification. If the measured gain is greater than the desired gain, the pump power is adjusted downward to provide for less amplification. The process is continuous and, therefore, returns to step 200, wherein an input power is measured.

Although the method of FIGS. 6 and 7 has been shown with specific steps in a specific order, it will be understood that the steps may be performed in a different order as appropriate, and other steps may be added or omitted as appropriate in keeping with the spirit of the present invention. The processes of FIGS. 6 and 7 may be repeated continuously or periodically, in parallel or otherwise. In addition, one or more of the steps may be omitted during one or more cycles of the method. For example, if the input power has not changed or not changed in a measurable or substantial way, steps 155 and 160 of FIG. 6 (determining feedforward pump power and adjusting the pump power) may be omitted.

Although the present invention has been described with several embodiments, various changes and modifications may be suggested to one skilled in the art. It is intended that the present invention encompass any changes and modifications as fall within the scope of the appended claims.

What is claimed is:

1. An optical amplifier, comprising:
   a gain medium;
   an input monitor, operable to measure a power of an ingress optical signal and generate an input power signal based on the power;
   an output monitor, operable to measure a power of an egress optical signal and generate an output power signal based on the power;
   an automatic gain controller including a feedforward module and a feedback module;
   the feedforward module operable to receive the input power signal generated by the input monitor and to generate a first control signal based on the input power signal;
   the feedback module operable to receive the input and output power signals generated by the input and output monitors and to generate a second control signal based on the input and output power signals; and
   the automatic gain controller operable to control pump energy provided to the gain medium based on the first and second control signals.

2. The optical amplifier of claim 1, wherein the pump energy is provided to the gain medium using a continuous wave laser.

3. The optical amplifier of claim 1, wherein the gain medium is erbium doped fiber.

4. The optical amplifier of claim 1, wherein the input and output power signals generated by the input monitor and output monitor are electrical signals.

5. The optical amplifier of claim 1, wherein the first and second control signals generated by the feedforward module and feedback module are electrical signals.

6. The optical amplifier of claim 1, wherein the first control signal is based on the input power, an aging factor, and the desired gain of the amplifier.

7. The optical amplifier of claim 1, wherein the control signal generated by the feedforward module is linearly proportional to the input power signal.

8. The optical amplifier of claim 1, wherein the control signal generated by the feedforward module is monotonic to the input power signal.

9. An optical amplifier, comprising:
a pump laser operable to generate pump energy;
a gain medium coupled to the pump laser and operable to amplify an optical signal with the pump energy to generate an amplified optical signal;
a controller coupled to the pump laser and the gain medium, the controller operable to control the pump laser based on feedforward monitoring of the optical signal, feedback monitoring of the amplified optical signal, and an aging factor of the pump laser.

10. The optical amplifier of claim 9, the controller further operable to control the pump laser based on a desired gain of the amplifier.

11. The method of claim 9, wherein the optical pump comprises a continuous wave laser.

12. The method of claim 9, wherein feedforward monitoring is based on a linear relationship between the input power and a pump current of an optical pump.

13. The method of claim 9, wherein feedforward monitoring is based on a monotonic relationship between the input power and a pump current of an optical pump.

14. The method of claim 9, wherein feedforward monitoring is based on a linear relationship between the input power and a pump current of a set of optical pumps.

15. The method of claim 9, wherein feedforward monitoring is based on a monotonic relationship between the input power and a pump current of a set of optical pumps.

* * * * *